3,036,994
CURABLE SYNTHETIC RESIN COMPOSITIONS FROM FORMALDEHYDE AND PHENOLIC COMPOUNDS, AND A PROCESS OF CURING SAME

Ferdinand Meyer, Ziegelhausen (Neckar), and Horst Erich Knobloch, Ludwigshafen (Rhine), Germany, assignors to Badische Anilin- & Soda-Fabrik Aktiengesellschaft, Ludwigshafen (Rhine), Germany
No Drawing. Filed Mar. 20, 1959, Ser. No. 800,626
Claims priority, application Germany Mar. 21, 1958
3 Claims. (Cl. 260—57)

This invention relates to synthetic resin compositions. More specifically, the invention relates to curable synthetic resin compositions from formaldehyde and phenolic compounds and to a process of curing such compositions.

It is known to cure reaction products from oxygen-containing naphthalene-formaldehyde condensation products, phenols and formaldehyde in the presence of compounds, which do not have a curing action, but enter the compositions chemically during the curing process such as chlorhydrins and epichlorhydrins, by heating these reaction products or with the aid of acidic compounds. There is the disadvantage, however, that owing to their toughness these curable compositions can be worked up only with difficulty, especially when large amounts of filler are used.

We have now found that cured synthetic resin compositions which are eminently resistant to chemicals are obtained by mixing curable condensation products from formaldehyde and (a) Naphthyl-hydroxyphenyl methane, dihydronaphthyl-hydroxyphenyl methane, tetrahydronaphthyl-hydroxyphenyl methane, or mixtures of the same, with (b) Other monohydric or polyhydric phenols with compounds which have no curing action but enter the compositions chemically and which have one or more chlorhydrin or epoxide groups in the molecule, and curing the mixtures thus obtained, which are liquid and therefore can easily be worked up, by heating or in the cold with the aid of acidic curing catalysts.

The curable condensation products may be prepared in the usual manner. For example, naphthalene, dihydronaphthalene or tetrahydronaphthalene may be converted into the corresponding chlormethylated products with formaldehyde or paraformaldehyde and hydrogen chloride. Usually, about 1 to 1.5 mols of formaldehyde and about 1 to 1.5 mols of hydrogen chloride is applied for each mol of naphthalene, dihydronaphthalene or tetrahydronaphthalene. There is thus formed mainly the monochlormethylated product, which may contain small amounts, i.e. about 10 to 25%, based on the amount of reacted hydrocarbon, of products which are chlormethylated two or more times.

The chlormethylated compounds are reacted with phenol in the usual manner. 1 mol of phenol may be applied for every mol of chlormethylated hydrocarbon. In the subsequent reaction, further amounts of phenol must always be added to the phenolic compound obtained, that is, naphthyl-hyroxyphenyl methane, dihydronaphthyl-hydroxyphenyl methane, or tetrahydronaphthyl-hydroxyphenyl methane. The product obtained, in admixture with another phenol, is converted with formaldehyde in the usual manner into a curable resole in an alkaline medium and in the presence of basic catalysts.

Other phenols which may be applied in admixture with the above-named compounds are, apart from phenol itself, for example aryl or alkyl phenols, the alkyl groups having up to 8, preferably up to 5, carbon atoms, for example p-cresol, m-cresol, p-hydroxy-diphenyl or p-tertiary-butyl phenol, furthermore monohydric mononuclear phenols in general, these phenols generally not containing reactive groups in addition to the phenolic hydroxyl group. Chlorinated or nitrated phenols, however, may also be used. Frequently, polyhydric and polynuclear phenols are also suitable. The substances of this type include resorcinol, hydroquinone, 4,4'-dihydroxy-diphenyl-dimethyl methane, 4,4'-dihydroxy-diphenyl cyclohexane, 4,4'-dihydroxy-diphenyl methane and 4,4'-dihydroxy-diphenyl oxide. In general, about 0.6 to 3 mols, preferably 0.8 to 2.5 mols of formaldehyde is used for every mol of phenolic hydroxyl groups. The formaldehyde may be applied in the form of paraformaldehyde or in aqueous solution, e.g. in a 30 to 40% aqueous solution.

As basic condensing agents there may serve any substances of this type commonly employed in the production of curable phenol resins (resoles), for example, primary, secondary or tertiary mono- or polybasic amines, for example, propylamine, diethylamine, piperazine, pyridine, methyl aniline, dimethyl aniline, ethylene diamine or benzidine, also ammonia, alkaline earth metals such as magnesium or calcium, basic metal oxides, especially alkaline or alkaline earth metal oxides or hydroxides, such as magnesium oxide, calcium oxide, sodium hydroxide or potassium hydroxide, or salts of weak acids with strong bases, for example, potassium carbonate, ammonium bicarbonate or sodium sulfite.

The above-mentioned condensing agents are in general applied in amounts of between 0.1 and 10% by weight, based on the mixture of phenols. The pH value of the aqueous reaction medium should exceed 7. A pH value of between 7.1 and 8.5 is particularly advantageous, although it may also be higher, for example 10 or 11. The condensation is preferably carried out at an elevated temperature, for example at 70 to 110° C. It is also possible, however, to work at temperatures below 70° C., for example at 20 to 55° C. In this case it may be preferable to apply a larger amount of the basic condensing agent, for example up to about 25% by weight based on the mixture of phenols. The molar ratio of naphthyl-hydroxyphenylmethane, dihydronaphthyl-hydroxyphenyl methane or tetrahydronaphthyl-hydroxyphenyl methane to the phenols used in admixture therewith may vary within wide limits, for example from 1:2 to 1:10, especially from 1:2.5 to 1:6.

The condensation is continued until a resinous product is obtained. Then the water which is contained in the reaction mixture is removed, for example by distillation in vacuo. There is obtained a viscous resin which has especially favorable properties when its viscosity amounts to between about 2,000 and 12,000 cp., preferably to between about 3,000 and 8,000 cp. It dissolves well in ethanol.

In accordance with the invention, the organic compounds, which during the curing process enter the compositions chemically, may be added to the mixture of naphthyl-hydroxyphenyl methane, dihydronaphthyl-hydroxyphenyl methane or tetrahydronaphthyl-hydroxyphenyl methane, either before, during or after the reaction of the mixture with formaldehyde. Equally good results are obtained when the naphthyl-hydroxyphenyl methane resin is not mixed until after its preparation with the compounds, which are used according to this invention and which enter the composition chemically.

The compounds to be admixed have at least one chlorhydrin or epoxide group in the molecule. They may be of an aliphatic or aromatic nature. There is the condition, however, that two aliphatic carbon atoms which are directly attached to each other, i.e. neighboring, should be connected by way of oxygen to form a 1,2 epoxide ring having 3 ring members, or that one of these neighboring carbon atoms should bear a chlorine atom and the other a hydroxyl group. The compounds of this type may additionally contain hydroxyl groups and/or halogen atoms, especially chlorine atoms. They usually consist of carbon, hydrogen, oxygen and halogen. Both low-molecular weight liquid and high-molecular weight resinous substances are suitable. Especially suitable compounds of this type include ethylene chlorhydrin, glycerine-1,2-dichlorhydrin, epichlorhydrin, dichlorbutylene oxide, styrene oxide, diglycidyl ethers, for example, ethylene glycol diglycidyl ethers or polyglycidyl ethers or the corresponding chlorhydrins, the polyglycidyl ethers being obtained in known manner by reacting polyalcohols or polyphenols with epichlorhydrin. On an average they contain more than one epoxide group, namely up to 2.5 epoxide groups in the molecule. Frequently, mixtures of these compounds are also suitable. In general, about 2 to 50, especially 5 to 30 parts by weight of these compounds are applied for every 100 parts by weight of the curable condensation product.

To the liquid curable mixtures thus obtained a large variety of fillers may be added. As fillers there are suitable for example, graphite or coal, mineral fillers such as quartz, shale flour, asbestos or sand, as well as organic fillers, for example wood flour. The fillers are preferably applied in amounts of between about 20 and 150%, based on the curable resin mixture.

The addition of furfurol has proved particularly favorable in some cases. It is especially advantageous to add about 3 to 20 parts by weight of furfurol, based on 100 parts of the resin mixture comprising the curable condensation product and the compound which enters the composition chemically during the curing process.

The resin mixtures cure even at temperatures between about 0 and 110° C., especially from 0 to 90° C., when acidic hardeners are added, preferably in amounts of between about 0.2 and 15% by weight, especially 2 to 10% by weight, based on the anhydrous resin. Particularly suitable acidic hardeners are all inorganic acids, such as for example, hydrochloric acid, sulfuric acid, phosphoric acid, furthermore organic acids, especially acetic acid, paratoluenesulfonic acid, adipic acid, succinic acid, maleic acid or phthalic acid. There may quite generally be used mono- or polybasic saturated or unsaturated acids or mixtures of the same.

The liquid curable mixtures may however also be cured by heating, for example to temperatures of between 110° and 200° C., especially 140° to 180° C.

The curable mixtures may be used as putties, coating or plastering agents as well as for producing shaped articles. The cured synthetic resin compositions are resistant to diluted and concentrated acids, alkalies and organic solvents, both in the heat and in the cold. They adhere admirably to metal, wood, porcelain and other materials. There is little shrinkage on curing.

The following examples will further illustrate this invention, but the invention is not restricted to these examples. The parts specified are parts by weight.

*Example 1*

137.5 parts of naphthalene is reacted at 70° C. with 107.5 parts of 30% formaldehyde while simultaneously introducing hydrogen chloride gas until chlormethylated naphthalene is obtained as an oil having the density 1.186, determined at 15° C., a chlorine content of 20.3% and a content of unreacted naphthalene of less than 2%.

112 parts of the product thus obtained is condensed at 45° C. with 60 parts of phenol. There is obtained a product having the OH number 340 and a viscosity of 2,500 cp. To this product there is added 274 parts of phenol, 440 parts of 30% aqueous formaldehyde and 34 parts of sodium sulfite and the whole condensed for 10 minutes at 100° C. Equally good results are obtained by adding 20 parts of sodium carbonate and condensing for 30 minutes at 100° C. The whole is then dehydrated at 20 mm. Hg and 60 to 70° C. and 25 parts of ethylene chlorhydrin and 115 parts of furfurol are added at 55 to 60° C. There is obtained a liquid resin having a viscosity of 850 to 1,000 seconds in the Ford beaker No. 4. A 1:1 mixture of this resin with graphite powder to which 6% of sulfuric acid, based on graphite, has been added, cures within 3 to 4 hours at room temperature, to form a resin which exhibits excellent resistance to acids and alkalies, both in the heat and in the cold. By using, instead of 25 parts of ethylene chlorhydrin, a similar amount of epichlorhydrin, there are obtained resins having similarly good chemical and mechanical properties.

Instead of phenol a mixture of 10% of cresol and 90% of phenol may be used.

*Example 2*

The procedure is that described in Example 1, but instead of ethylene chlorhydrin there is added 25 parts of a polyepoxide compound which has been prepared in known manner from 1 mol of glycerine and 3 mols of epichlorhydrin in the presence of boron trifluoride etherate as catalyst and subsequent treatment of the chlorhydrin ether thus obtained with sodium hydroxide solution. The composition thus obtained cures fast when heated, has excellent resistance to chemicals and may be used as a putty.

We claim:
1. A curable mixture comprising a curable resole (A) which has been prepared in an alkaline medium from a mixture of a compound ($A_1$) selected from the group consisting of naphthyl-hydroxyphenyl methane, dihydronaphthyl-hydroxyphenyl methane and tetrahydronaphthyl-hydroxyphenyl methane and ($A_2$) phenol where the molar ratio of said compound ($A_1$) to said phenol ($A_2$) ranges from 1:2 up to 1:10 and which contains from 0.6 to 3 mols of formaldehyde per 1 mol of the phenolic hydroxyl groups, and an organic compound (B) which enters the composition chemically during the curing of the resole (A), said compound (B) being selected from the group consisting of glycidyl ethers, alkylene chlorhydrins, dichlorbutylene oxide, styrene oxide and epichlorhydrins, said compound (B) bearing in the molecule at least one radical of the group consisting of $\alpha,\beta$-chlorhydrin groups and 1,2-epoxide groups, there being used 2 to 50 parts by weight of compound (B) for every 100 parts of resole (A).

2. The composition of matter formed when the curable mixture of claim 1 is cured by heating to temperatures between about 110° and 200° C.

3. The composition of matter formed when the curable mixture of claim 1 is cured by adding to said curable mixture from 0.2% to 15% by weight, based on the weight of the anhydrous curable mixture of an acid selected from the group consisting of hydrochloric, sulfuric, phosphoric, acetic, paratoluenesulfonic, adipic, succinic, maleic, and phthalic acid, the curing temperature being between about 0° and 110° C.

References Cited in the file of this patent
UNITED STATES PATENTS

| | | |
|---|---|---|
| 2,506,486 | Bender et al. | May 2, 1950 |
| 2,597,159 | May et al. | May 20, 1952 |

FOREIGN PATENTS

| | | |
|---|---|---|
| 305,575 | Germany | Jan. 4, 1921 |